United States Patent [19]

Shimizu et al.

[11] Patent Number: 5,444,114
[45] Date of Patent: Aug. 22, 1995

[54] THERMOPLASTIC RESIN COMPOSITION

[75] Inventors: Hisanaga Shimizu; Shinji Takeshita; Kazuo Kitamura, all of Mihara, Japan

[73] Assignee: Teijin Chemicals, Ltd., Tokyo, Japan

[21] Appl. No.: 214,047

[22] Filed: Mar. 15, 1994

Related U.S. Application Data

[63] Continuation of Ser. No. 930,439, filed as PCT/JP91/00029, Jan. 16, 1991, abandoned.

[51] Int. Cl.$^6$ ................................................. C08K 3/10
[52] U.S. Cl. .................................... 524/413; 524/294; 524/295; 524/296
[58] Field of Search ................ 524/413, 294, 295, 296

[56] References Cited

U.S. PATENT DOCUMENTS

| | | | |
|---|---|---|---|
| 4,344,874 | 8/1982 | Akagi et al. | 524/296 |
| 4,442,254 | 4/1984 | Aratani | 524/413 |
| 4,626,564 | 12/1986 | Saito et al. | 524/413 |
| 4,806,586 | 2/1989 | Naki | 524/413 |
| 4,857,227 | 8/1989 | Adams et al. | 252/299.65 |
| 5,019,615 | 5/1991 | Mizuno et al. | 524/100 |
| 5,112,913 | 5/1992 | Horiuchi et al. | 525/133 |
| 5,112,914 | 5/1992 | Mizuno et al. | 525/134 |

FOREIGN PATENT DOCUMENTS

| | | |
|---|---|---|
| 0219958 | 4/1987 | European Pat. Off. . |
| 0301587 | 2/1989 | European Pat. Off. . |
| 0484849 | 5/1992 | European Pat. Off. . |
| 129346 | 11/1987 | Japan . |
| 63-6049 | 12/1988 | Japan . |

OTHER PUBLICATIONS

Database WPI Week 9135, Derwent Publications Ltd., London, GB; AN 91-257975 & JP-A-3 169 836 (Mitsubishi Kasei Corp) 23 Jul. 1991.

*Primary Examiner*—Paul R. Michl
*Assistant Examiner*—John J. Guarriello
*Attorney, Agent, or Firm*—Sherman and Shalloway

[57] ABSTRACT

According to the present invention there is provided a thermoplastic resin composition comprising an aromatic polycarbonate resin, potassium titanate and an organic acid. This resin composition can be advantageously used for molding large parts for precision machines and large parts for automobiles.

12 Claims, No Drawings

THERMOPLASTIC RESIN COMPOSITION

This application is a continuation of application Ser. No. 07/930,439, filed as PCT/JP91/00029, Jan. 16, 1991 now abandoned.

TECHNICAL FIELD

The present invention relates to an aromatic polycarbonate resin composition having the excellent properties of aromatic polycarbonate resins and excellent dimensional stability, or a thermoplastic resin composition composed mainly of an aromatic polycarbonate resin and other thermoplastic resin.

BACKGROUND ART

It has been well known to add an inorganic filler to a thermoplastic resin to improve the latter's dimensional stability.

However, addition of an inorganic filler to an aromatic polycarbonate resin has a serious drawback that the carbonate bond in resin molecular chain is cleaved, inviting large reduction in molecular weight. Molecular weight reduction is particularly large when potassium titanate is added; for example, when potassium titanate is added to an aromatic polycarbonate resin having a viscosity-average molecular weight of 25,000 in an amount of about 10% by weight, the viscosity-average molecular weight decreases to 15,000 or less; thus, it has been impossible to use potassium titanate in an aromatic polycarbonate resin.

As a method for eliminating the drawback, there is known a method of treating an inorganic filler beforehand with a silane coupling agent. Application of this method to potassium titanate, however, has been unable to provide an aromatic polycarbonate resin which can be put in practical use.

OBJECT OF THE INVENTION

The object of the present invention is to provide an aromatic polycarbonate resin composition or a resin composition composed mainly of an aromatic polycarbonate resin and other thermoplastic resin which composition, even when potassium titanate is added to the aromatic polycarbonate resin component, gives rise to very slight reduction in molecular weight, shows the excellent properties inherently possessed by aromatic polycarbonate resins and has excellent dimensional stability.

The present inventor made extensive study in order to achieve the above object. Consequently, the present inventor knew that addition of a combination of potassium titanate and a particular amount of maleic acid to an aromatic polycarbonate resin can significantly suppress reduction in resin molecular weight. The present inventor made further study based on the above finding. As a result, the present invention has been completed.

DISCLOSURE OF THE INVENTION

The present invention relates to a thermoplastic resin composition wherein 1 part by weight or more of potassium titanate and 0.1–10% by weight, based on the potassium titanate, of an organic acid are mixed with 100 parts by weight of a resin component which is an aromatic polycarbonate resin or a mixture of an aromatic polycarbonate resin and 70% by weight or less of other thermoplastic resin.

The aromatic polycarbonate resin used in the present invention is an aromatic polycarbonate resin which is derived from a dihydric phenol and which has a viscosity-average molecular weight of 16,000–50,000, preferably 18,000–30,000. It is ordinarily produced by a solution method or a melt method between a dihydric phenol and a carbonate precursor. As the typical examples of the dihydric phenol, there are mentioned 2,2-bis(4-hydroxyphenyl)propane [bisphenol A], bis(4-hydroxyphenyl)methane, 1,1-bis(4-hydroxyphenyl)ethane, 2,2-bis(4-hydroxy-3-methylphenyl)propane, etc. Preferable dihydric phenols are bis(4-hydroxyphenyl)alkane type compounds, particularly bisphenol A. These dihydric phenols can be used singly or in admixture of two or more. As the carbonate precursor, there are mentioned carbonyl halides, carbonates, haloformates, etc. As the typical examples, there are mentioned phosgene, diphenyl carbonate, dihydric phenyl dihaloformates, and mixtures thereof. In producing an aromatic polycarbonate resin, there can be used, as necessary, a molecular weight modifier, a branching agent, a catalyst, etc.

The thermoplastic resin mixed with the aromatic polycarbonate resin can be any as long as it is miscible with the aromatic polycarbonate resin. There is mentioned, for example, one resin selected from a thermoplastic polyester type resin, a polyarylene ester type resin, a polystyrene type resin, a polyethylene type resin, a polypropylene type resin, a diene type resin, a polyamide type resin, a polyether type resin, a polysulfone type resin, a polyphenylene sulfide type resin, etc., or a mixture of two or more of said resins.

The thermoplastic polyester type resin is a polymer or copolymer obtained by subjecting to a condensation reaction an aromatic dicarboxylic acid or an ester-formable derivative thereof and a diol or an ester-formable derivative thereof, both used as main materials. The aromatic dicarboxylic acid used herein is preferably terephthalic acid, isophthalic acid, naphthalenedicarboxylic acid or the like. The diol is preferably a linear methylene-chain type aliphatic diol having 2–10 carbon atoms or an alicyclic diol having 6–15 carbon atoms. As the specific examples of the diol, there can be mentioned ethylene glycol, trimethylene glycol, tetramethylene glycol, hexamethylene glycol, neopentyl glycol, 3-methylpentanediol(2,4), 2-methylpentanediol(1,4), 2-ethylhexanediol(1,3), diethylene glycol, cyclohexanedimethanol, etc. Preferable thermoplastic polyester type resins are a polyethylene terephthalate, a polybutylene terephthalate, and copolymer polyesters obtained by substituting 30 mole % or less of the acid component and/or diol component of the above terephthalate with other component.

The polyarylene ester type resin is a polymer or copolymer obtained by subjecting to a condensation reaction a dihydric phenol or a derivative thereof and an aromatic dicarboxylic acid or a derivatives thereof, both used as main materials. As the dihydric phenol used herein, there are preferably used those described with respect to the aromatic polycarbonate resin. The derivative of the dihydric phenol is a diester between the dihydric phenol and an aliphatic or aromatic carboxylic acid. As the aromatic dicarboxylic acid, there are preferably used those described with respect to the thermoplastic polyester type resin. In producing the polyarylene ester type resin from the dihydric phenol or the derivative thereof and the aromatic dicarboxylic acid or the derivative thereof, there is used a desired process such as interfacial polycondensation process, solution polycondensation process, melt polycondensation process or the like.

As the polystyrene type resin, there can be mentioned a polystyrene for general use, an impact-resistant polystyrene, an AS resin, an ABS resin, an AES resin, an MBS resin, an MAS resin, an AAS resin, a styrene-butadiene block copolymer, a styrene-maleic anhydride copolymer, etc.

As the polyethylene type resin, there can be mentioned a high-density polyethylene resin, a low-density polyethylene resin, a linear low-density polyethylene resin, an ethylene-vinyl acetate copolymer, an ethylene-propylene copolymer, an ethylene-acrylic acid ester copolymer, an ethylene-glycidyl (meth)acrylate copolymer, etc.

As the propylene type resin, there can be mentioned a polypropylene resin, a propylene-vinyl acetate copolymer, a propylene-vinyl chloride copolymer, etc.

The diene type resin is a polymer of a diene structure monomer alone, such as 1,2-polybutadiene resin, trans-1,4-polybutadiene resin or the like, or a copolymer of said monomer and other monomer copolymerizable therewith, or a mixture thereof.

The polyamide type resin is a polymer of an aminocarboxylic acid compound alone or a dicarboxylic acid compound and a diamine compound, or a polymer obtained by subjecting $\alpha,\omega$-caprolactam to ring-opening polymerization.

As the polyether type rein, there can be preferably mentioned a polyphenylene ether (co)polymer.

The potassium titanate used in the present invention may be powdery or fibrous. Before use, it may be subjected to a surface treatment with a treating agent such as silane coupling agent.

The amount of the potassium titanate used need not be specified. However, the present invention is effective when the amount is such as significantly affecting the reduction in molecular weight of aromatic polycarbonate resin, i.e. 1 part by weight or more per 100 parts by weight of the aromatic polycarbonate resin. A particularly remarkable effect is obtained when the amount is 5 parts by weight or more.

The organic acid used in the present invention is a carboxylic acid, a sulfonic acid or the like. Particularly preferably are aromatic carboxylic acids having 15 or less carbon atoms, and aliphatic carboxylic acids having 20 or less carbon atoms. There can be specifically mentioned aliphatic carboxylic acids such as acetic acid, propionic acid, butyric acid, malonic acid, succinic acid, glutaric acid, stearic acid, maleic acid, maleic anhydride, fumaric acid, citraconic acid, citraconic anhydride, itaconic acid and the like; aromatic carboxylic acids such as benzoic acids, phthalic acid, phthalic anhydride, isophthalic acid, terephthalic acid and the like; and so forth.

Use of the organic acid can significantly suppress the reduction in molecular weight of aromatic polycarbonate resin, by potassium titanate.

When the organic acid is used in too small an amount, there is obtained no sufficient suppression for molecular weight reduction and, when the organic acid is used in too large an amount, the effect is saturated. The amount of the organic acid used is ordinarily selected in the range of 0.1–10% by weight based on the amount of potassium titanate used. The optimum amount is selected in the range of 1–10% by weight based on potassium titanate.

The composition of the present invention can be produced by mixing the above-mentioned components by a desired method, for example, a tumbler blender, a Nauta mixer, a Banbury mixer, a kneading roll, an extruder or the like. In the composition of the present invention, it is possible to mix, as necessary, other additives, for example, an antioxidant, a flame retardant, an antistatic agent, a release agent, an ultraviolet absorber, etc. unless the object of the present invention is not impaired.

APPLICABILITY IN INDUSTRY

The composition of the present invention, even when a sufficient amount of potassium titanate is added to the aromatic polycarbonate resin component, gives significantly low reduction in molecular weight of said resin, shows the excellent properties inherently possessed by said resin, and has excellent dimensional stability. Therefore, the composition is applicable to a desired melt molding method, for example, injection molding or the like and can be used particularly in applications wherein the use of polycarbonate resin has been impossible, for example, large parts of precision machines, large parts of automobiles, etc. Thus, the composition exhibits excellent effects in industry.

BEST MODE FOR CARRYING OUT THE INVENTION

The present invention is hereinafter described in detail by way of Examples. In the Examples, parts refer to parts by weight, and viscosity-average molecular weight $\overline{M}$ was obtained by dissolving a sample in methylene chloride so as to give a concentration of 0.7 g/dl at 20° C., determining the specific viscosity $\eta_{sp}$ of the resulting solution, and inserting the specific viscosity to the following formula:

$$\eta_{sp}/C = [\eta] + 0.45[\eta]^2 C$$

$$[\eta] = 1.23 \times 10^{-4} M^{0.83}$$

where C=0.7

Impact strength was expressed as an Izod value (kgf cm/cm) measured by using notched samples of ¼" and ⅛" in thickness.

EXAMPLES 1–8 AND COMPARATIVE EXAMPLES 1–2

A potassium titanate and an organic acid both shown in Table 1 were added, in amounts (parts by weight) shown in Table 1, to 100 parts by weight of a polycarbonate powder (Panlite L-1250 manufactured by Teijin Chemicals Ltd.) obtained from a bisphenol A having a viscosity-average molecular weight of 24,900. The mixture was subjected to extrusion using a 30-mm vented extruder (VSK-30 manufactured by Nakatani K.K.) at a cylinder temperature of 280° C., to obtain pellets. The pellets were dried at 120° C. for 5 hours using a circulating hot air drier and then subjected to injection molding using an injection molding machine (J-120SA manufactured by Nippon Seiko K.K.) at a cylinder temperature of 290° C. and a mold temperature of 80° C., to prepare test pieces for measurement of physical properties.

The viscosity-average molecular weights $\overline{M}$ of each pellet and each molded article (test piece for measurement of physical properties) as well as the properties of each test piece are shown in Table 1.

Incidentally, in Table 1, the potassium titanate fiber 1 is TISMO D-102 manufactured by Ohtsuka Chemical Co. and the potassium titanate fiber 2 is TIBREX manufactured by Kawatetsu Mining Corporation.

TABLE 1

| | Potassium titanate | | Organic acid | | $\overline{M}$ of Pellet | $\overline{M}$ of molded article | Impact strength | | Deflection temperature under load (°C.) |
|---|---|---|---|---|---|---|---|---|---|
| | Kind | Amount | Kind | Amount | | | ⅛ | ¼ | |
| Reference Example | — | — | — | — | 24,900 | 24,500 | 80 | 12 | 135 |
| Example 1 | Potassium titanate fiber 1 | 10 | Maleic acid | 0.5 | 23,500 | 21,900 | 22 | 17 | 140 |
| Example 2 | Potassium titanate fiber 1 | " | Acetic acid | " | 23,300 | 21,000 | 22 | 17 | 140 |
| Example 3 | Potassium titanate fiber 1 | " | Maleic anhydride | " | 22,000 | 19,500 | 20 | 15 | 139 |
| Example 4 | Potassium titanate fiber 1 | " | Phthalic anhydride | " | 23,500 | 21,900 | 23 | 17 | 140 |
| Example 5 | Potassium titanate fiber 1 | " | Isophthalic acid | " | 23,000 | 20,800 | 22 | 17 | 140 |
| Comparative Example 1 | Potassium titanate fiber 1 | " | — | — | 15,100 | 14,100 | 2 | 1 | 136 |
| Example 6 | Potassium titanate fiber 2 | " | Fumaric acid | 0.5 | 23,400 | 21,800 | 25 | 17 | 140 |
| Example 7 | Potassium titanate fiber 2 | " | Maleic acid | " | 23,400 | 21,800 | 22 | 17 | 140 |
| Example 8 | Potassium titanate fiber 2 | " | Isophthalic acid | " | 23,000 | 20,800 | 22 | 17 | 140 |
| Comparative Example 2 | Potassium titanate fiber 2 | " | — | — | 15,000 | 14,000 | 2 | 2 | 136 |

We claim:

1. A thermoplastic resin composition wherein 1 part by weight or more of potassium titanate and 0.1–10% by weight, based on the potassium titanate, of an organic acid or anhydride selected from the group consisting of aromatic carboxylic acids and anhydrides having 15 or less carbon atoms and aliphatic carboxylic acids and anhydrides having 20 or less carbon atoms are mixed with 100 parts by weight of a thermoplastic resin component which is an aromatic polycarbonate resin or a mixture of an aromatic polycarbonate resin and 70% by weight or less of other thermoplastic resin selected from the group consisting of thermoplastic polyester resin, polyarylene ester resin, polystyrene resin, diene resin, polyamide resin, polyether resin, polysulfone resin and polyphenylene sulfide resin.

2. An aromatic polycarbonate thermoplastic resin composition comprising
   one hundred parts by weight of said aromatic polycarbonate resin,
   1 part by weight or more of potassium titanate, based on weight of said aromatic polycarbonate resin, and
   0.1 to 10% by weight, based on weight of said potassium titanate, of an organic acid or anhydride selected from the group consisting of aromatic carboxylic acids and anhydrides having 15 or less carbon atoms and aliphatic carboxylic acids and anhydrides having 20 or less carbon atoms.

3. The thermoplastic resin composition of claim 2 comprising said aromatic polycarbonate resin and 70% by weight or less of an other thermoplastic resin selected from the group consisting of polyester resin, polyarylene ester resin, polystyrene resin, diene resin, polysulfone resin, and polyphenylene sulfide resin.

4. An aromatic polycarbonate thermoplastic resin composition comprising
   one hundred parts by weight of said aromatic polycarbonate resin, said aromatic polycarbonate resin comprising a bis(4-hydroxyphenyl) $C_1$–$C_3$ alkyl compound,
   1 to 10 parts by weight of potassium titanate, based on weight of said aromatic polycarbonate resin, and
   0.1 to 10% by weight of an organic acid or anhydride, based on the weight of said potassium titanate, wherein said organic acid or anhydride is a member selected from the group consisting of aromatic carboxylic acids and anhydrides having 1 to 15 carbon atoms and aliphatic carboxylic acids and anhydrides having 1 to 20 carbon atoms.

5. The thermoplastic resin composition of claim 4 comprising said aromatic polycarbonate resin and 70% by weight or less of another thermoplastic resin selected from the group consisting of polyester resin, polyarylene ester resin, polystyrene resin, diene resin, polysulfone resin, and polyphenylene sulfide resin.

6. The thermoplastic resin composition of claim 4 wherein the aromatic carboxylic acid or anhydride is a member selected from the group consisting of benzoic acid, phthalic acid, phthalic acid anhydride, isophthalic acid and terephthalic acid.

7. The thermoplastic resin composition of claim 4 wherein the aromatic carboxylic acid or anhydride is a member selected from the group consisting of phthalic acid anhydride and isophthalic acid.

8. The thermoplastic resin of claim 4 wherein the aliphatic carboxylic acid or anhydride is a member selected from the group consisting of fumaric acid, acetic acid, maleic acid and maleic acid anhydride.

9. The thermoplastic resin composition of claim 4 comprising 5 to 10 parts by weight of potassium titanate.

10. The thermoplastic resin composition of claim 4 comprising 0.5 to 10% by weight of the organic acid.

11. The thermoplastic resin composition of claim 4 wherein the aromatic polycarbonate resin has a viscosity-average molecular weight of 16,000–50,000.

12. The thermoplastic resin composition of claim 4 wherein the aromatic polycarbonate resin has a viscosity-average molecular weight of 18,000–30,000.

* * * * *